June 1, 1937. H. H. LEWIS ET AL 2,082,752
ICE CREAM FREEZER
Filed Feb. 12, 1934
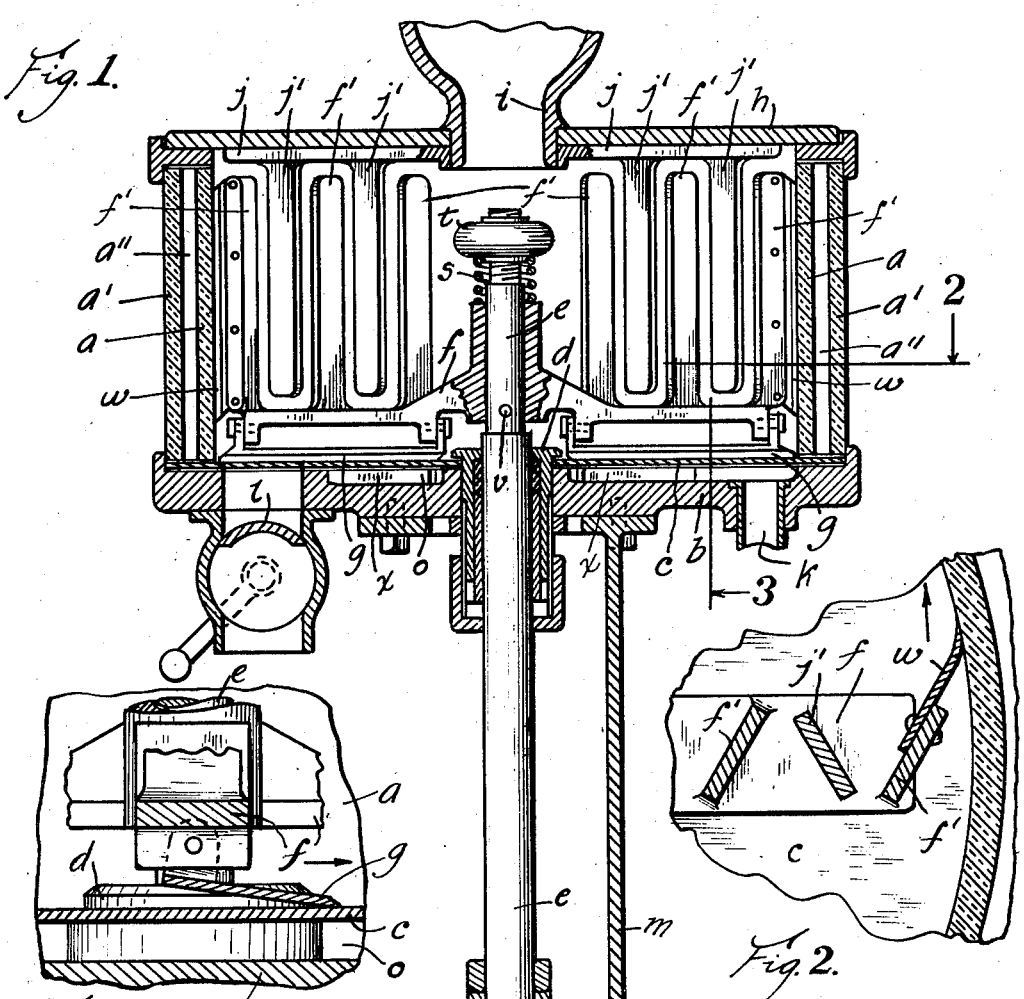
Fig. 1.
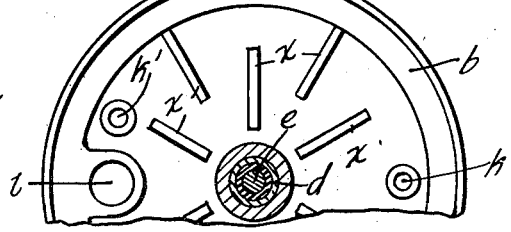
Fig. 3.
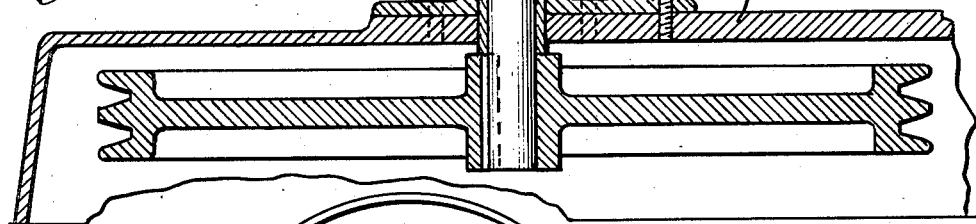
Fig. 2.
Fig. 4.
Inventors
Harry H. Lewis
William H. Ziegler
by
Atty Patented June 1, 1937

2,082,752

UNITED STATES PATENT OFFICE 2,082,752

ICE CREAM FREEZER

Harry H. Lewis and William H. Ziegler, Portland, Oreg.

Application February 12, 1934, Serial No. 710,912

6 Claims. (Cl. 62—114)

Our invention relates to ice cream freezers.

The process of making ice cream, as well known, consists in freezing and whipping it at the same time. The cooling or freezing means is applied to the outside of the container or freezing chamber, and whipping, which goes on within the container, not only mixes air with the liquid while it is being chilled, but functions to bring all portions of the liquid into close contact with the surface of the container in which the freezing mixture is located.

We have observed, however, that there is considerable loss of efficiency in the average freezer.

In some freezers the cylindrical freezing chamber is arranged on a horizontal axis, while in others it is arranged on a vertical axis. In both cases we have found that the beating element is not adapted to cause that portion of the mixture in which freezing is more or less retarded to be held in close contact with the chilling surface of the freezing chamber. The object of our invention is to remedy this condition.

A novel feature of our invention is that we cause the freezing medium to be applied to the bottom of a cylindrical freezing chamber. This is important because in the freezing process the more liquid portion of the mixture tends to remain at the bottom of the chamber, while the fluffier, frozen portion tends to rise to the top. By our invention the chilling process is applied directly to the more liquid portion at the bottom of the mixture, and assures the freezing of the entire mixture with minimum consumption of time and power. Furthermore, the beater in the freezing chamber is provided with scrapers at the bottom functioning to scrape off any deposit of frozen mixture on the bottom which otherwise would have a tendency to form an insulating film on the bottom and thus retard the freezing process. By our device a relatively large quantity of mixture can be frozen in a short time.

Another feature of our invention is that the sides of the freezing chamber consist of double walls of transparent material such as glass, with a dead air space between them. The dead air space serves as insulation between the two surfaces, and the transparency of the walls makes the process visible at all times to the operator, thus enabling him to know the condition of the mixture.

Incidental features of our invention, and the details of construction and operation of our device are hereinafter fully described with reference to the accompanying drawing, in which:

Fig. 1 represents a vertical central cross section of our freezer;

Fig. 2 represents a fragmentary cross section on line 2 of Fig. 1 but on larger scale;

Fig. 3 represents a fragmentary cross section on line 3 of Fig. 1 also on larger scale; and Fig. 4 shows a fragmentary top view of the base $b$ of Fig. 1 drawn to a reduced scale.

Our freezer consists of two cylindrical transparent walls $a$ and $a'$ with an air space between them $a''$. These walls are mounted on a circular base $b$ which is preferably constructed of material possessing low heat conductivity, in order to prevent as much loss of cold from the freezing element to outside atmosphere as possible. The base $b$ is provided with a thin metallic disc $c$ which forms the top or cover of a recess $o$ in the base; and constitutes the bottom of the freezing chamber; and said recess $o$ constitutes a channel or passage-way for the refrigerating medium.

A vertical shaft $e$ passes thru the bearing $d$ in the center of the base $b$ of the freezing chamber and is rotated by power. On the shaft $e$ is removably mounted the mixing or beating member which comprises two or more horizontal, radially extended arms $f$. A spring $s$ and nut $t$ on the upper end of shaft $e$ serve to keep the mixing or beating member in place and the removable pin $v$ causes the said beating member to be turned with the rotation of the shaft $e$. The radially extended arms $f$ are provided with a series of vertical spaced fingers $f'$. The outermost of these fingers $f'$ of each arm are provided with flexible wiping strips $w$, which bear against the surface of the interior cylindrical wall $a$.

To the bottoms of each of the horizontal arms $f$ are hinged scrapers $g$ which bear upon the surface of the metallic disc or cover $c$ of the channel $o$ of the bottom $b$ of the freezing chamber.

A removable cover plate $h$ is provided for the freezing chamber, preferably of material of low heat conductivity, and fastened to the bottom of the cover plate $h$ are horizontal radially extended arms $j$, corresponding to the arms $f$, and bearing a series of pendent fingers $j'$ spaced so as to allow the upward extending spaced fingers $f'$ to pass between them when in motion. These intersecting fingers $f'$ and $j'$ constitute the mixing or beating mechanism for the mixture within the freezing chamber and are preferably arranged so that the vertical planes of the fingers $f'$ are at angles with the vertical planes of the fingers $j'$, as indicated in Fig. 2. The lid $h$ is provided with a filling neck $i$ thru which the liquid to be frozen may be poured into the freezing chamber.

The channel $o$ of the base $b$ is provided with an opening $k$ thru which the refrigerating medium is pumped into said channel $o$, and also a similar opening $k'$ (see Fig. 4) by which said refrigerating medium is returned to the refrigerating pump. The said channel $o$ is provided with vertical baffles $x$ (see Fig. 4) causing the refrigerating medium to be spread over all portions of the channel $o$. The base $b$ is also provided with an outlet valve at $l$, located near the outer edge or periphery of the base, and placed under a hole or opening in the bottom $c$ of the freezing chamber. (This outlet valve $l$ enables the mixture to be drawn off from the chamber as and when desired.) The base $b$ is rigidly supported by a standard $m$ mounted on the foot $p$ which incloses the driving mechanism for the shaft $e$.

In the operation of the freezer the mixture to be chilled and whipped is poured into the freezing chamber thru the opening $i$ in the cover $h$. The refrigerating medium is pumped into the channel $o$ beneath the disc or bottom $c$ thru the opening $k$, and the freezer is set in motion. As the chilling takes place the whipping action incorporates more and more air into the mixture until the desired consistency is obtained. The rotation of the arm $f$ sets up centrifugal force which drives heavier portions of the mixture constantly against the walls of the container $a$, thus inducing a cavity, as it were, in the central portion of the body of the mixture into which cavity the heavier, overlying stratum of the mixture may drop back by gravity. Thus, we obtain a circulatory motion in both horizontal and vertical planes; the circulation in the vertical plane inducing the constant return of the more liquid portions of the mixture into direct contact with the freezing element of the machine, and thus assuring rapid freezing of the mixture. During the beating, the more liquid portion of the mixture is further kept by gravity closest to the chilling surface of disc $c$, but the scrapers $g$ keep the latter constantly scraped, thus preventing an insulating film freezing on the bottom disc $d$, which would interfere with the freezing of the mixture.

The channel $o$ beneath the bottom disc is readily adaptable to either a liquid form of refrigerant or to the expansion of refrigerant gases.

When the freezing of the mixture is completed and it is desired to remove the same from the mixing chamber, the combined action of the revolving bottom scrapers $g$ and the wall wipers $w$, and the force of gravity and centrifugal force furnished by the rotation of the arms $f$ serve to dispense the material thru the valve $l$ when this is open.

In ordinary practice the amount of air which is mixed with the liquid, and which causes it to become fluffy and to swell in bulk during the process of freezing, is varied by increasing or decreasing the speed with which the beater or whipping mechanism rotates. The changing of this speed requires complication in the mechanism furnishing the power. In our invention an increase or decrease in the whipping action is accomplished by using an increased or decreased number of intersecting members.

For instance, for freezing certain mixtures it may be desirable to reduce the whipping action of our device. In order to accomplish this we provide interchangeable lids $h$ which may have fewer radially extended arms as $j$, or fewer pendent fingers as $j'$ or for certain mixtures it may be desired to omit all pendent fingers. Since the interchangeable lids are readily constructed from what we have above said with regard to their purpose, we have not deemed it necessary to illustrate the same.

Our invention makes it possible also to use the same freezer with equal efficiency for freezing large or small amounts of mixture, since there is no waste of chilling surface. A larger volume of mixture could be taken care of merely by increasing the height of the walls of the mixing chamber.

The designation of our invention as an "ice cream freezer" of course includes its use for any frozen food product.

We claim:

1. In an ice cream freezer the combination of a cylindrical freezing chamber having a vertical axis, said freezing chamber having a hollow bottom thru which the refrigerant is continuously circulated, and baffles within said hollow bottom whereby the refrigerant is constrained against a direct course from inlet to outlet thru said hollow bottom, but is directed and caused by said baffles to follow a more or less sinuous course, and thereby spread simultaneously in all directions within said hollow bottom, thus causing the rapid and uniform reduction in temperature of the entire bottom of the freezing chamber, a stirrer in said chamber rotating about said axis thereof, and wipers, carried by said stirrer, arranged to bear firmly but yieldably on the interior face of said bottom, whereby to prevent excessive deposits in certain local areas on the interior face of the bottom of the mixture in excess of deposits on other areas thereof, and thus promoting uniform progress in the freezing of the mixture within said freezing chamber.

2. In an ice cream freezer the combination of a cylindrical freezing chamber having a vertical axis, said freezing chamber having a hollow bottom thru which the refrigerant is continuously circulated, and radially disposed lengthwise, relatively staggered baffles within said hollow bottom whereby the refrigerant is constrained against a direct course from inlet to outlet thru said hollow bottom, but is directed and caused by said baffles to follow a more or less sinuous course, and thereby spread simultaneously in all directions within said hollow bottom, thus causing the rapid and uniform reduction in temperature of the entire bottom of the freezing chamber, a stirrer in said chamber rotating about said axis thereof, and wipers, carried by said stirrer, arranged to bear firmly but yieldably on the interior face of said bottom, whereby to prevent excessive deposits in certain local areas on the interior face of the bottom of the mixture in excess of deposits on other areas thereof, and thus promoting uniform progress in the freezing of the mixture within said freezing chamber.

3. In an ice-cream freezer the combination of a cylindrical freezing chamber having a vertical axis and inner and outer transparent concentric walls, spaced apart to provide an insulating air space between them, means for producing a freezing temperature in said chamber, a driven stirrer in said freezing chamber constantly rotated about said axis, a wiper carried by the lateral extremity of said stirrer, said wiper consisting of a vertical, flexible strip in height corresponding to that of said inner wall, said strip arranged to bear firmly against the interior face of said inner wall, the flexibility of the strip permitting it to yield to the irregularities in the face, whereby the particles of the freezing mixture deposited on said interior face are constantly removed, and continuous visibility of the progress of the freezing process within said chamber is substantially maintained.

4. In an ice-cream freezer the combination of a cylindrical freezing chamber having a vertical axis and inner and outer transparent concentric walls, spaced apart to provide an insulating air space between them, means for producing a freezing temperature in said chamber, a driven stirrer in said freezing chamber constantly rotated about said axis, a wiper carried by the lateral extremity of said stirrer, said wiper consisting of a vertical, flexible strip in height corresponding to that of said inner wall, said strip terminating in a chisel edge at its outer end and arranged to bear firmly against the interior face of said inner wall, the flexibility of the strip permitting it to yield to the irregularities in the face, said chisel edge pointed in the direction of rotation of said stirrer, whereby the particles of the freezing mixture deposited on said interior face are constantly removed, and continuous visibility of the progress of the freezing process within said chamber is substantially maintained.

5. In an ice-cream freezer the combination of a cylindrical freezing chamber having a vertical axis and inner and outer transparent concentric walls, spaced apart to provide an insulating air space between them, a hollow bottom to said freezing chamber and means for circulating a refrigerant thru said hollow bottom continuously in an irregular course, a driven stirrer in said freezing chamber constantly rotated about said axis, a scraper carried on the bottom of said stirrer arranged to bear firmly but yieldably against the interior face of the bottom of said freezing chamber, a wiper carried by the lateral extremity of said stirrer, said wiper consisting of a flexible strip in height corresponding approximately to that of said inner wall, said strip arranged to bear firmly against the interior face of said inner wall, the flexibility of the strip permitting it to yield to the irregularities in the said face, whereby the particles of the freezing mixture deposited on said interior face are constantly removed, and continuous visibility of the progress of the freezing process within said chamber is substantially maintained.

6. In an ice-cream freezer comprising a vertical cylindrical freezing chamber peripherally inclosed by inner and outer transparent concentric walls spaced apart to provide an insulating space between them, means for producing a freezing temperature in said chamber, means for constantly removing deposits of the freezing mixture from the interior face of the said inner transparent wall, and thus maintaining substantially continuous visibility of the progress of the freezing process within said freezing chamber, said means comprising a wiper rotated in and about the axis of said chamber, the wiper comprising a horizontal arm carrying a vertical flexible elongated strip at its extremity, said strip in height corresponding to that of said inner wall, and bearing firmly against the said inner wall, the flexibility of said strip permitting it to yield to any irregularities on the interior surface of said inner wall.

HARRY H. LEWIS.
WILLIAM H. ZIEGLER.